Jan. 19, 1932.  J. J. TRACY ET AL  1,842,217
DRIVE MECHANISM FOR TRACTORS AND THE LIKE
Filed Dec. 6, 1923  8 Sheets-Sheet 1

INVENTORS
James J. Tracy and
Arthur E. Palmer.
By Fay, Oberlin & Fay ATT'YS.

Jan. 19, 1932.  J. J. TRACY ET AL  1,842,217
DRIVE MECHANISM FOR TRACTORS AND THE LIKE
Filed Dec. 6, 1923  8 Sheets-Sheet 3

INVENTORS
James J. Tracy and
BY Arthur E. Palmer

Fay, Oberlin + Fay
ATTORNEYS

INVENTORS
James J. Tracy and
BY Arthur E. Palmer
Day, Oberlin & Day
ATTORNEYS

Fig. 9

Patented Jan. 19, 1932

1,842,217

UNITED STATES PATENT OFFICE

JAMES J. TRACY, OF SHAKER VILLAGE, AND ARTHUR E. PALMER, OF EAST CLEVELAND, OHIO; SAID PALMER ASSIGNOR TO SAID TRACY

DRIVE MECHANISM FOR TRACTORS AND THE LIKE

Application filed December 6, 1923. Serial No. 678,859.

The present improvements comprise in combination with a transmission mechanism for tractors and the like an arrangement of braking and steering means of novel design whereby the turning effect of braking one driving member or the other of the tractor is utilized in order to steer the same. While of general applicability, the improvements are of special interest in connection with tractors of the so-called planking tread or portable track type, in which, instead of driving wheels of the familiar sort, an endless track serves as a means of support and propulsion. In this type of tractor, by providing for the selective driving of the one side or the other, the use of separate steering wheels may be entirely eliminated.

One object of the present invention is to provide a simple and easily operated mechanism for thus selectively braking the one traction member or the other, the same mechanism being adapted for simultaneously braking both such members, where it is desired to stop the tractor or slacken its speed. In this connection clutches are provided back of the first gear reduction instead of behind the level drive, whereby the respective driving members may be driven or released as desired and the brakes are applied to the transmission mechanism beyond such clutches so as to enable the corresponding side of the mechanism, including the driving member, to be fully stopped upon uncoupling the motor from such side by appropriate operation of the corresponding clutch. Furthermore, where operating under load it becomes unnecessary to apply the brake at all, in order to secure the desired turning effect. The mechanism also includes an improved mounting for the driving members as well as a novel arrangement of gearing for connecting the transmission mechanism with such members.

To the accomplishment of the foregoing and related ends, said invention, then, consists of the means hereinafter fully described and particularly pointed out in the claims, the annexed drawings and the following description setting forth in detail certain mechanism embodying the invention, such disclosed means constituting, however, but one of various mechanical forms in which the principle of the invention may be used.

Figure 7:
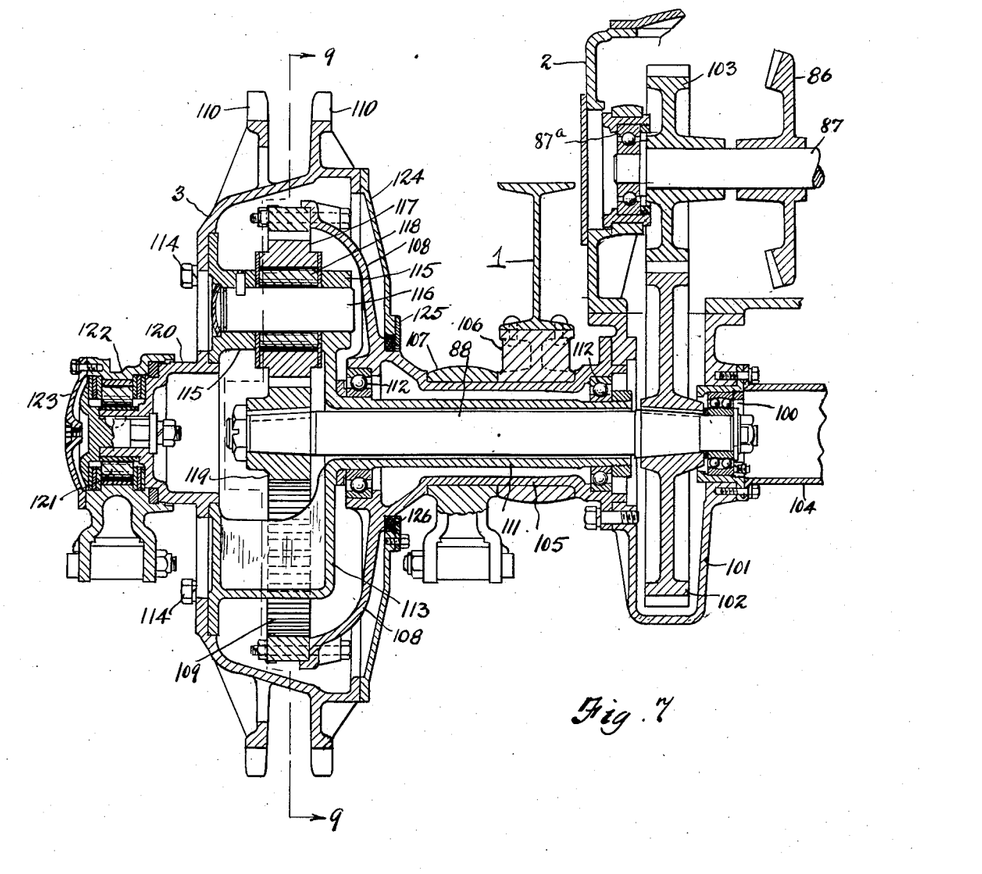
Fig. 7 is a transverse section of another portion of the mechanism, the plane of such section being indicated by the line 7—7, Figs. 1 and 2.

The forward part of the tractor, including the power plant, has been omitted from the drawings as being of no interest in the present connection. It will be understood that such power plant is carried by the forwardly extending portions (not shown) of the side members 1 of the frame which, as they appear in Fig. 3 for example, are preferably of I-beam section. The same frame members serve to support the sectional housing 2 wherein the drive mechanism of present interest is mounted, said frame members in turn being supported on driving members 3, as shown in Fig. 7, such driving members being shown as sprocket wheels adapted to carry an endless track of familiar type, as need not be described in detail.

Figures 1, 8:
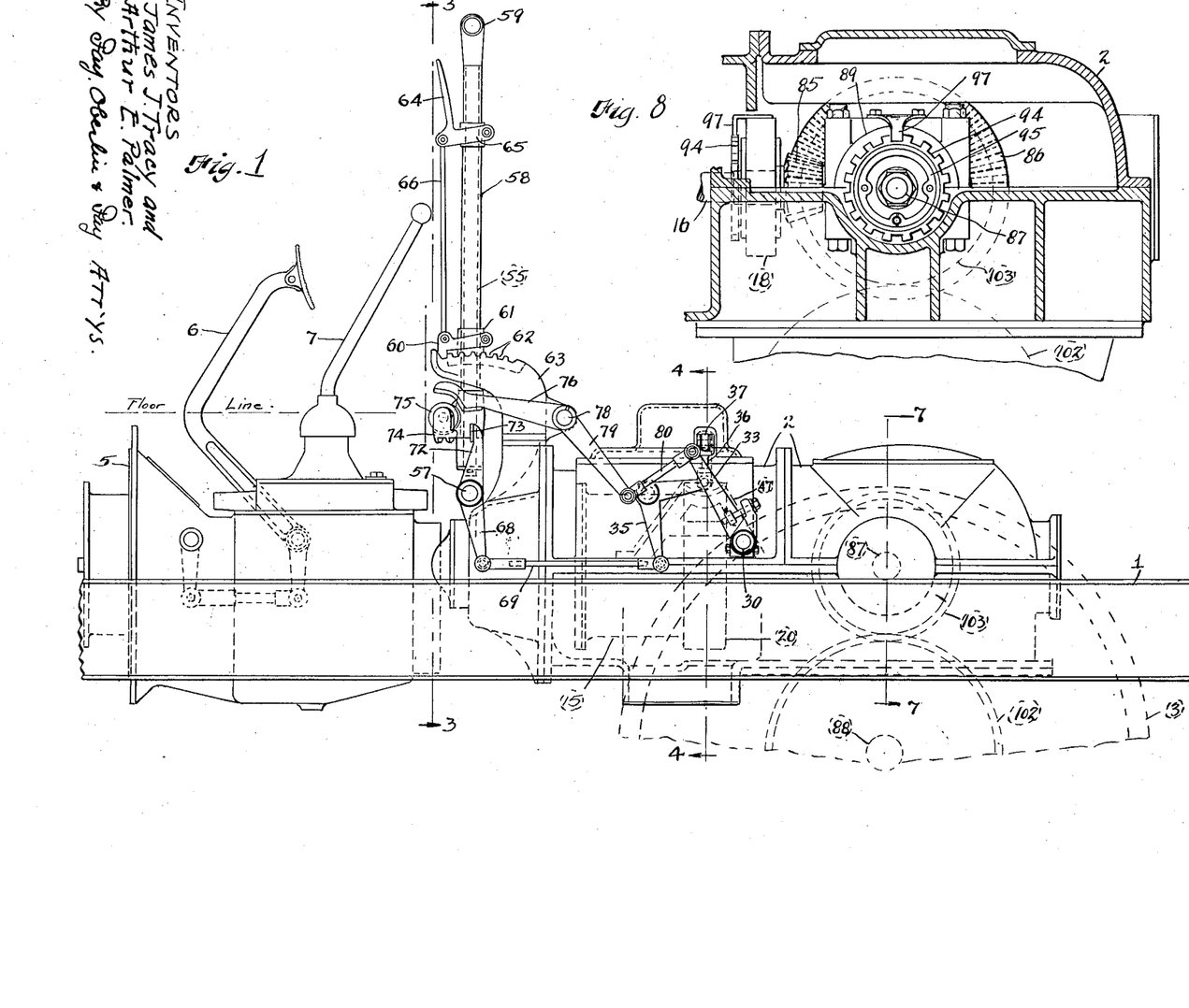
Fig. 1 is a side elevation of a drive mechanism embodying the present improvements, the driving members being shown in dotted outline only.
Fig. 8 is a transverse section of still another portion of the mechanism with parts appearing in elevation, the plane of the section being indicated by the line 8—8, Fig. 2.
Figure 2:
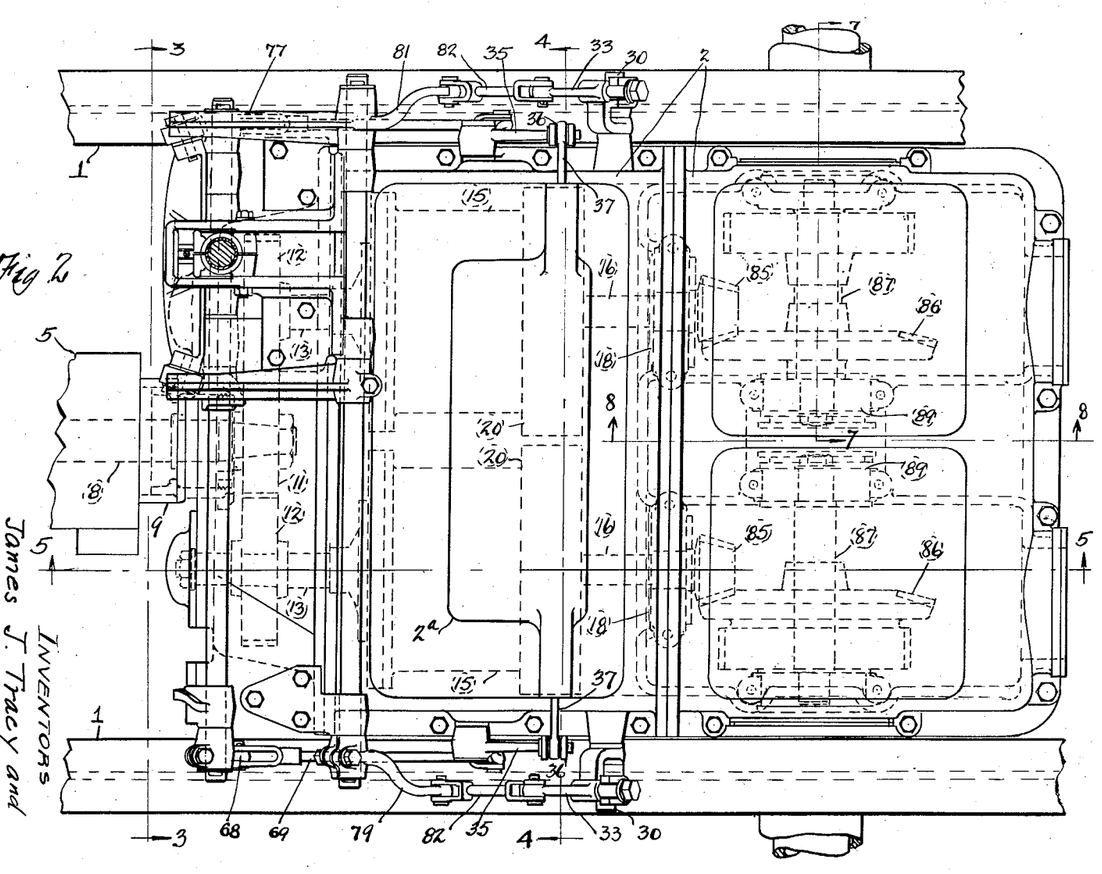
Fig. 2 is a plan view of such mechanism.

Power from the motor is transmitted to the mechanism in housing 2 through a transmission gearing of standard construction mounted in a housing 5 and provided with a clutch pedal 6 and gear shifting lever 7 as usual (see Fig. 1). The rearwardly projecting end of driven shaft 8 of such gearing, wherewith the propeller shaft is connected in an ordinary automobile or truck, is received in a central opening of the forward section of the housing 2 and there connected to drive through two separate lines of transmission gearing the respective sprocket wheels 3. As best shown in Fig. 2, an extension 9 of housing 5 has a telescoping fit in an opening 10 in housing 2, whereby the two housings are coupled together while still permitting limited endwise and angular movement of the one relatively to the other.

Figure 5:
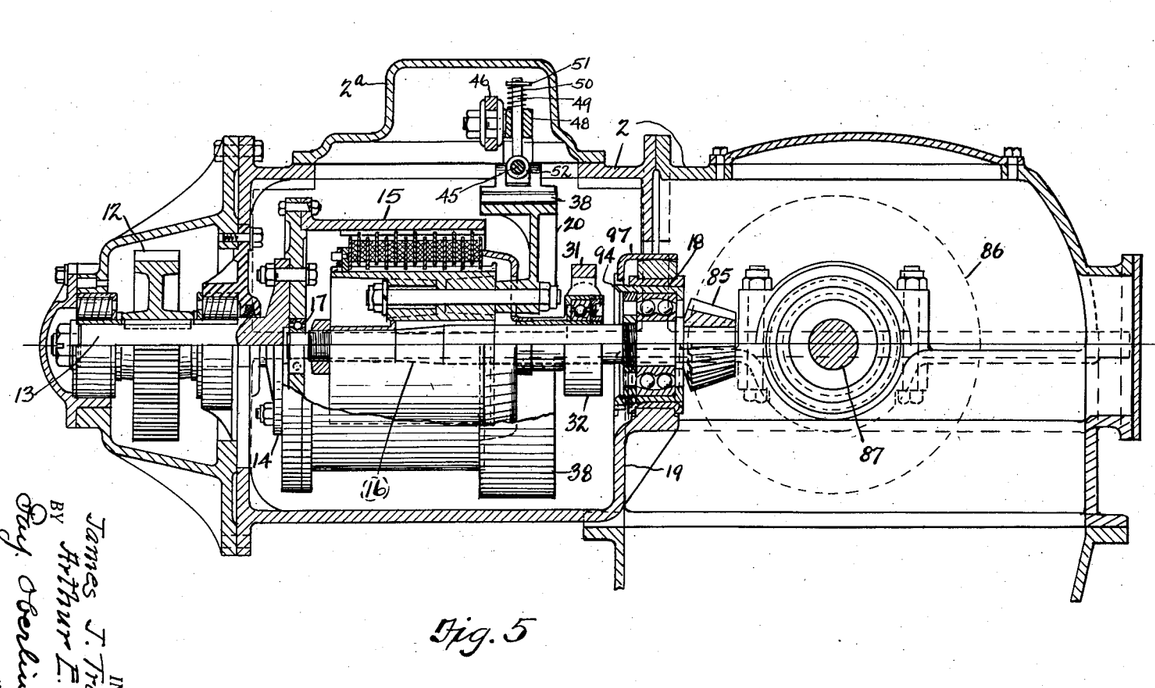
Fig. 5 is a longitudinal section of the mechanism, the plane of the section being indicated by the line 5—5, Figs. 2, 3, and 4.

A spur gear 11 on the end of shaft 8, which thus lies within the housing 2, meshes with two gears 12 on the corresponding shafts 13 which are symmetically disposed on each side of said shaft 8 and serve as driving shafts for corresponding transmission mechanisms leading to the respective driving members 3 of the tractor. The manner in which the shafts 13 are journaled in the forward section of housing 2 is best shown in Fig. 5, from which it will also be seen that the rear end of each such shaft terminates in a flange 14 to which is bolted the adjacent end of the outer member of a clutch 15 of the friction disk type. The inner member of said clutch is carried by a shaft 16 aligned with the shaft 13 and journaled at its forward end in a radial bearing 17 provided in the end of clutch member 15, just referred to as being bolted to flange 14. The other, i. e. rear, end of shaft 16 is journaled in a bearing 18 of special construction resting on an intermediate transverse wall 19 of housing 2, a detailed description of bearing 18 being reserved until later.

Figure 6:
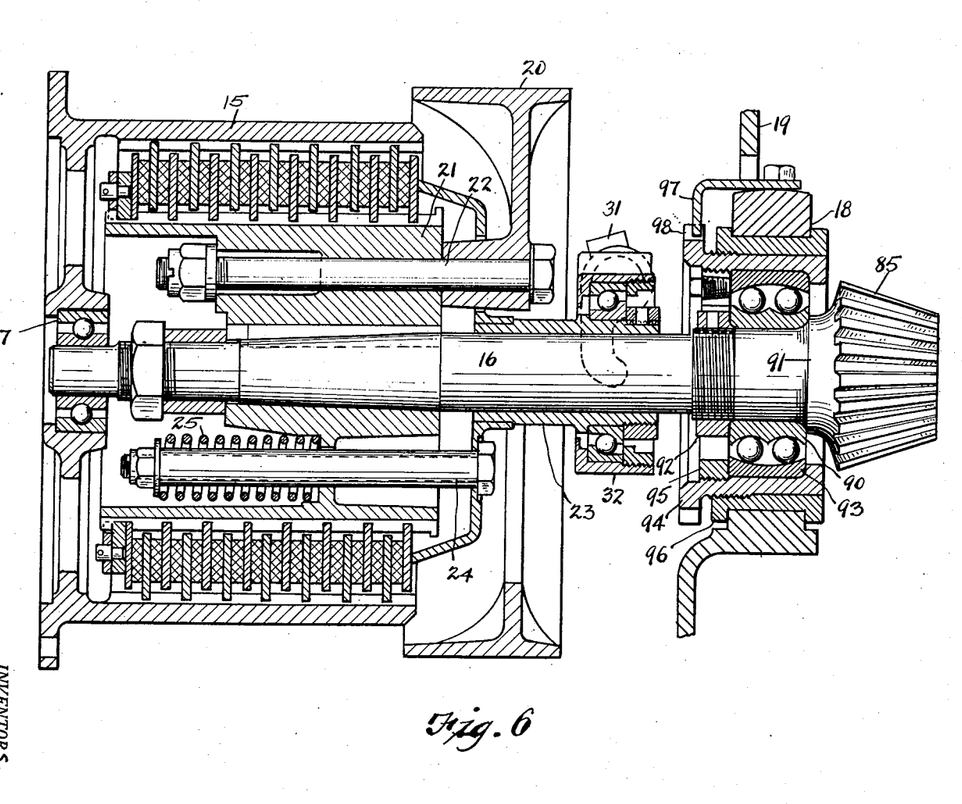
Fig. 6 is a sectional view of a portion of the mechanism on the same plane as Fig. 5 but on a larger scale.

As best shown in the enlarged detail view of Fig. 6, a brake drum or pulley 20 is fixedly secured to the stationary member 21 of the clutch by bolts 22, said drum being formed to permit free movement of the movable clutch member 26 that is carried by and adapted to be actuated through the medium of a sliding collar 23 on shaft 16. The two clutch members are connected together through the medium of bolts 24 and compression springs 25, that normally set the clutch, as will be readily understood.

A transverse shaft 30 journaled at its end in the adjacent side wall of housing 2 (see Figs. 1 and 2), and at its inner end in a longitudinal wall provided for the purpose, carries at its inner end a fork 31 (see Figs. 5 and 6) that engages with a ring 32 rotatably mounted on said sleeve 23 but held against longitudinal movement with respect thereto so that as a result, rocking movement of shaft 30 will serve to displace said sleeve longitudinally of shaft 16, or, in other words, to actuate the clutch to couple shaft 16 to shaft 13 or uncouple the same, as may be desired. Upon the outer end of shaft 30 is mounted a lever arm 33 whereby it is adapted to be thus rocked through suitable control mechanism presently to be described.

Figure 4:
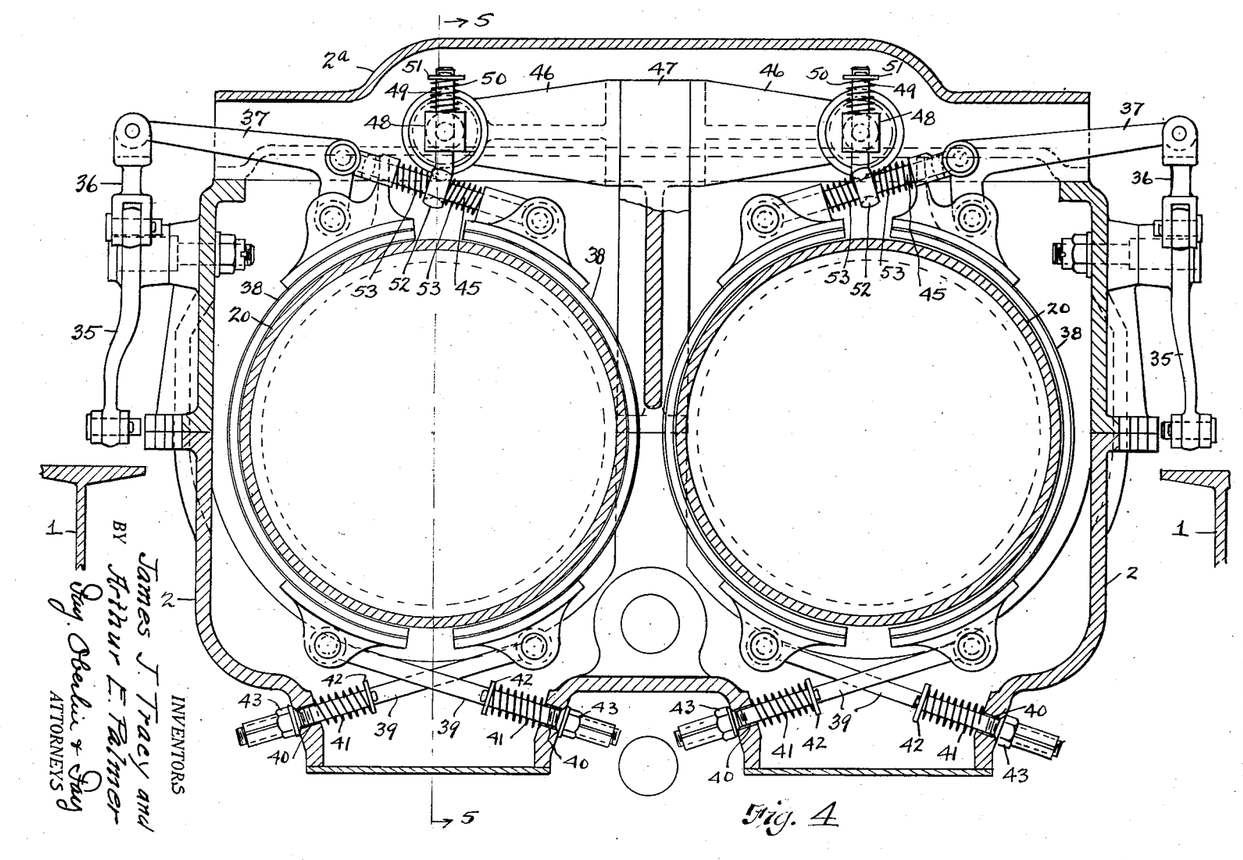
Fig. 4 is a transverse section of the mechanism on the plane indicated by the line 4—4, Figs. 1 and 2.

Exteriorly mounted on housing 2 at a point forwardly of said shaft 30 is a bell crank lever 35 (see Figs. 1, 2, and 4), the respective arms of which normally extend in an approximately horizontal and vertical direction. Such horizontal arm is connected by means of a link 36 with one arm of a transversely disposed bell crank 37 mounted inside housing 2 or specifically in the cover 2a that is fitted to this particular portion of said housing, and the other shorter arm of bell crank 37 is pivotally attached to the upper end of one of two approximately semi-circular brake shoes 38 which are fitted to the corresponding brake drum 20. The lower ends of these brake shoes are secured to adjacent portions of housing 2 by means of rods 39 pivotally attached at their inner ends to such shoes, such rods lying in intersecting relation and having their outer ends slidably held in suitable apertures 40 in the casing. Compression springs 41, interposed between collars 42 on said rods and the adjacent casing wall, tend to force said rods inwardly as far as the adjusting nuts 43 on their outer projecting ends will permit.

It has been noted that the short arm of bell crank 37 is attached to the upper end of the one, specifically the outermost, of the two brake shoes 38. Pivotally connected with the upper end of the inner shoe is one end of a short rod or link 45, the other end of which provides the fulcrum point for said bell crank lever 37. In other words, the latter is pivotally attached to such other end of said rod 45, with the result that when the long arm of the lever is depressed, the two brake shoes 38 are drawn together and caused to frictionally engage the drum 20. Each rod or link 45 and along therewith the two brake shoes 38 are supported from a bracket 46 that projects transversely from a supporting structure 47 that rises inside of the casing 2 between the two brake drums 20. In the outer end of such bracket 46 is adjustably mounted a guide block 48 in which in turn is mounted a vertically reciprocable pin 49, the latter being retained in normal elevated position by means of a compression spring 50 interposed between said block 48 and a collar 51 on the upper end of the pin. The lower end of the pin is in the form of an eye 52 through which passes the rod or link 45, the opening in said eye permitting longitudinal shifting movement of the link and such opening furthermore being beveled at each side so as to permit of limited oscillatory movement of the link. A compression spring 53 is interposed between such eye 52 and a suitable abutment on the link whereby the latter is normally maintained in properly centered relation to such eye, as will be readily understood. As a result of the foregoing construction, a floating support is provided for the brake shoes 38 whereby they are normally maintained out of contact with the wheel 20; however, as previously explained, the downward pull on the outwardly projecting arm of bell crank 37 will close such shoes upon the brake wheel, and due to the flexible character of the support provided for the latter, an equal pressure will at all times be exerted by both. As previously indicated, suitable control means are provided for operating the two clutches that serve to couple the respective shafts 13 with the corresponding shafts 16 in the two trains of transmission gearing, also for operating the corresponding brake mechanisms last described above. Such control means of manual character, that is involving muscular action by the operator, as hand or foot operated means, are so arranged and constructed that either of said shafts 13, and thus the motor, may be uncoupled from the corresponding shaft 16 and thus from the driving member connected to be driven from said shaft and the corresponding brake applied; or both of said shafts 13 may be simultaneously thus uncoupled from the motor and both brakes thereupon simultaneously applied.

The control means for thus operating the clutches and brakes include as the two principal actuating elements a solid vertical shaft 55 (see Figs. 1, 2, and 3), the lower end of which is oscillatorily, but longitudinally fixedly, secured to a yoke 56, that is in turn oscillatorily supported on a transverse shaft 57 at the forward end of housing 2. An outer tabular shaft or column 58 surrounds said shaft 55, and the latter is provided at its upper end, which projects beyond the upper end of said column, with a cross arm 59 whereby it may be oscillated about its own axis. It will be understood that the elements just described, comprising such inner shaft 55 and outer surrounding column 58, will be located in front of the seat or station which it is intended the driver of the tractor is to occupy. For the purpose of retaining shaft 55 in desired angular relation about transverse supporting shaft 57, two companion pawls 60 are provided, being pivotally attached to a collar 61 on the outer tubular shaft or column 58 in position to engage with suitable notches 62 in parallel plates 63 that form parts of a housing between which said shaft 55 with surrounding column 58 are guided in their conjoint oscillatory movement. For the purpose of raising the pawls when it is desired to shift the angular position of the parts in question, a hand lever 64 is pivotally attached about a transverse axis to a collar 65 near the upper end of said column, said lever being connected with the pawls by means of a link 66.

Figure 3:
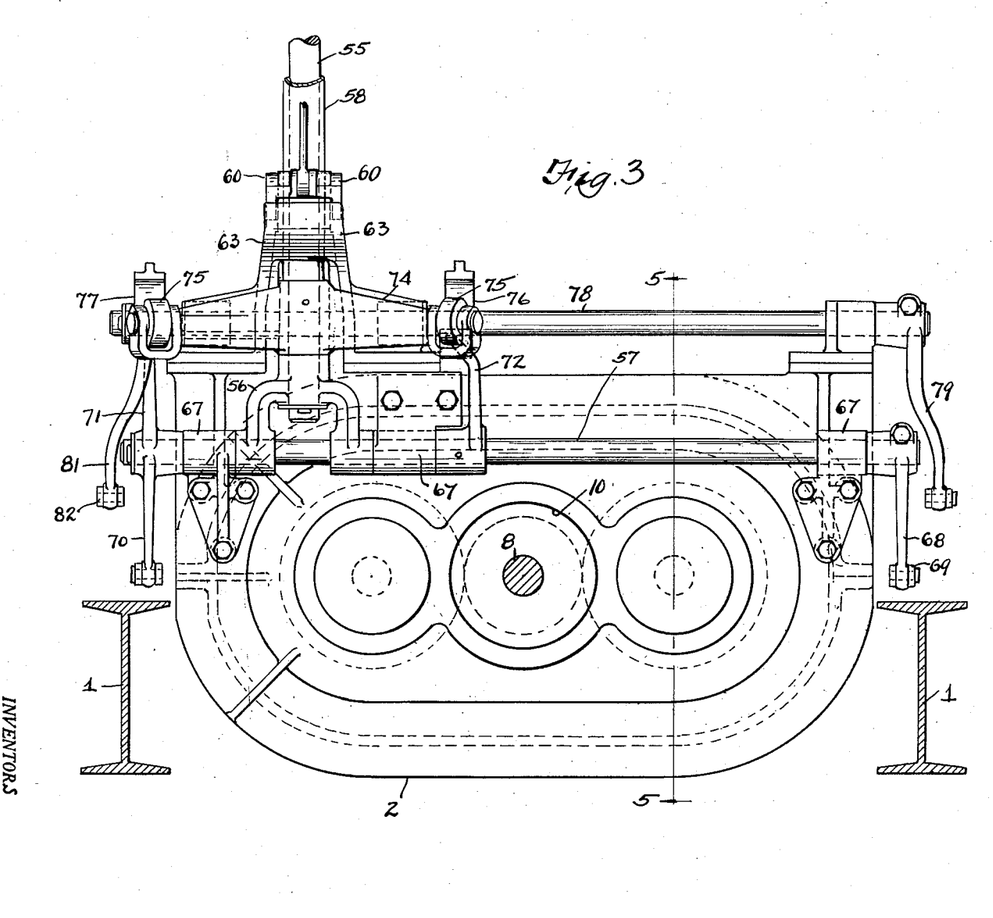
Fig. 3 is a front elevation thereof with parts appearing in transverse section, as indicated by the line 3—3, Figs. 1 and 2.

In addition to its function as a support for the yoke 56, and thus for shaft 55 and column 58, the transverse shaft 57 at the front end of the housing, such shaft being oscillatorily mounted in suitable journals 67, is provided at its one end, the right-hand end as shown in Fig. 3, with a lever 68 that is connected by means of a link 69 with bell crank lever 35, whereby the brake device on the side of the mechanism in question is actuated as hereinbefore described. On the opposite end of transverse shaft 57, the left as shown in said Fig. 3, there is oscillatorily mounted a lever 70 that corresponds with lever 68 and is similarly connected to actuate the other brake device. Formed integrally with such last mentioned lever 70 is an upstanding arm 71, and fixedly secured to transverse shaft 57 at a point located an equal distance on the opposite side of yoke 56 is a duplicate arm 72. As shown in Fig. 1, said arm 72 is provided at its upper end with a vertically disposed flattened face 73 and the arm 71 is formed with a similar face, such two faces being disposed in the plane of a cross bar 74 fixedly secured to shaft 55 at a point adjacent yoke 56. Normally, as shown in Fig. 1, said cross bar lies a short distance forwardly of the flattened faces on said levers 71 and 72, but the parts are so arranged that upon a rearward swinging movement of column 58 and shaft 55, said cross bar is brought into forcible contact with said faces and thus serves simultaneously to rock shaft 57 with the lever 68 carried at one end thereof and the lever 70 which is oscillatorily mounted on the other end of said shaft. Similarly if with the column 58 and shaft 55 in the vertical position shown in Fig. 1, said shaft is rotated in one direction or the other by means of the cross head 59, the corresponding end of said cross bar 74 will be brought into forcible contact with the flattened face of either lever 71 or lever 72, depending upon the direction of rotation of said shaft 55. As will thus be seen, this type of actuating mechanism, with its simplicity and entire absence of intermediary mechanically-connected elements affords remarkable advantages in manufacture and operation; and for convenience and conciseness in designation, such means will be referred to hereinafter as trip means. Simultaneous oscillation, as in the first described situation, of the two levers 68 and 70 will serve to set both the brakes, while individual oscillation of said levers, resulting from the turning movement of shaft 55 in one direction or the other, will serve to set either of said brakes selectively.

Adjacent each of its ends, cross bar 74 carries a roller 75 mounted upon a substantially horizontal axis and so disposed as to be adapted to engage with the free end of one or the other of two forwardly extending levers 76 and 77. Such first mentioned lever, like lever 72, is fixedly mounted upon a transverse shaft 78 journaled in suitable bearings located to the rear of the housing composed of notched plates 63, such shaft being provided at its corresponding end, the right as shown in Fig. 3, with a lever 79 that is connected by means of a link 80 with the lever 33 whereby the corresponding clutch is actuated. The other lever 77 that is mounted on said shaft 78 is oscillatory thereon and has formed integrally therewith an extension 81 that constitutes a lever, a counterpart of lever 79, and like it connected through the medium of a link 82 with the lever 33 by means of which the other clutch is actuated.

The form of the forward faces of levers 76 and 77 on shaft 78, wherewith the rollers 75 are adapted to engage (see Fig. 1), is such that the first effect of such engagement will be to rock the lever upwardly, whereupon the roller passes under a horizontally disposed flattened face and so serves to retain the lever with the corresponding clutch out of action; or in case both rollers are simultaneously brought into engagement with both levers, then both clutches are held out. It will be observed that the ends of levers 71 and 72, wherewith the cross bar 74 directly engages, and the ends of levers 76 and 77, wherewith the rollers 75 on said cross bar engage, as last described, are so located with respect to each other that either levers 76 or 77, or both of them, will be actuated to throw out the clutch or clutches before the levers for either or both of levers 71 and 72 are actuated to set the brakes. It will be observed also that the levers 76, 77, in riding up on the rollers 75 transfer the burden of the clutch-spring thrust thereto by an easy-working cam action and thus correspondingly relieving the operator's arm from the spring tension, that is, the force exerted by the spring to close the clutch.

The rear end of each shaft 16 carries, preferably integrally formed therewith, a beveled pinion 85 (Figs. 5 and 6) that meshes with a corresponding beveled gear 86 keyed or otherwise fixedly secured on a short transverse shaft 87. From the latter is driven in turn a live axle section 88 which drives the corresponding sprocket wheel 3 or equivalent traction member (see Fig. 7). As shown in Fig. 2, both beveled gears 86 face in the same direction since the two shafts 13, and thus shafts 16, are driven in the same direction by the gearing that connects said shafts 13 with shaft 8. Accordingly, the one beveled gear 86 will face inwardly and the other face outwardly with respect to the longitudinal median line of the mechanism. Other than in this particular, the driving connections between the respective shafts 16 and the corresponding wheels 3 are identical on both sides.

The outer end of each shaft 87 is journaled in a radial ball bearing 87a supported in the adjacent side wall of housing 2 (see Fig. 7), while the inner end of such shaft is journaled in a combination radial and thrust bearing 89 (shown in end elevation in Fig. 8) of the same design as those wherein the rear ends of shaft 16 are journaled. Each of these bearings (see Fig. 6) comprises an inner raceway 90 secured in place on the shaft by being forced against a shoulder 91 thereon by means of a nut 92. In the case of the bearings for shafts 16, the base or hub of the beveled gear 85 provides the shoulder in question, while in the case of shaft 87, a shoulder is formed specially for the purpose. So too in the case of such last mentioned shafts, the abutment is directed outwardly towards the end of the shaft instead of inwardly, but the construction otherwise is identical. The outer raceway is carried in a shell 94, being secured in place therein by means of an externally threaded ring 95, and such shell is in turn secured in a bushing 96 that forms the direct support for the bearing as a whole. The shell has threaded engagement with such bushing so that by rotation thereof, its position may be longtudinally shifted in the latter, a keeper 97 that is adapted to engage with one of a series of peripheral notches 98 in the shell being provided to lock the latter in adjusted position. It will be noted that longitudinal adjustment of such shell, by carrying with it the outer raceway, serves correspondingly to displace or adjust the inner raceway and therewith the shaft. In this way proper meshing of the gears may be initially secured and wear taken up with relatively little trouble.

The live axle section 88 is full floating, its inner end being journaled in a self-aligning bearing 100 mounted in a gear housing 101 that depends beneath the main housing 2 and serves to enclose a large spur gear 102 that is keyed on said shaft and meshes with a smaller spur gear 103 keyed on the corresponding shaft 87 located directly thereabove. The inwardly directed faces of the two gear housings 101 are connected together by a tubular strut 104 which insures rigidity to the structure. Projecting outwardly from said gear housing 101 is a short tubular housing 105 upon which rests the corresponding side frame member 1, the latter being secured thereto by a bearing block 106 that permits necessary slight relative rotative movement incidentally to weaving of the frame. Said tubular housing 105 similarly has attached thereto one of the blocks 107 to which is secured the frame of the traction member where the tractor is of the endless track or crawler type as in the case in hand. There is furthermore secured to the outer end of said tubular housing 105, by means of spider arms 108, an internally toothed ring gear 109.

The sprocket wheel 3 consists, as shown in Fig. 7, of a hollow body provided about its periphery with two rows of sprocket teeth 110 and is supported in the housing 105 by means of a tubular hub 111 that surrounds but does not contact with the live axle section 88. This hub is journaled in suitable ball bearings 112 at the respective ends of the tubular casing and is formed at its outer end with integral spider arms 113, to which sprocket wheel 3 is secured by means of bolts 114. Formed intermediately of the arms 113, which are shown as three in number (see Fig. 9), but integrally joined therewith in front and with the hub 111 in the rear respectively, are apertured supports 115 wherein are held short spindles 116 on each of which in turn is mounted a spur pinion 117 through the medium of roller bearings 118. The three pinions 117 are driven by means of a fourth pinion 119 that is keyed to the outer end of axle section 88 and engage with the teeth of the ring gear 109. The ring gear being relatively stationary, rotation of shaft 88, and thus of pinion 119, will cause the pinions 117 to travel around said ring gear at a reduced rate of speed, carrying therewith the composite wheel structure consisting of hub 111, the spider arms 113 and the sprocket wheel 3, as will be readily understood.

Figure 9:
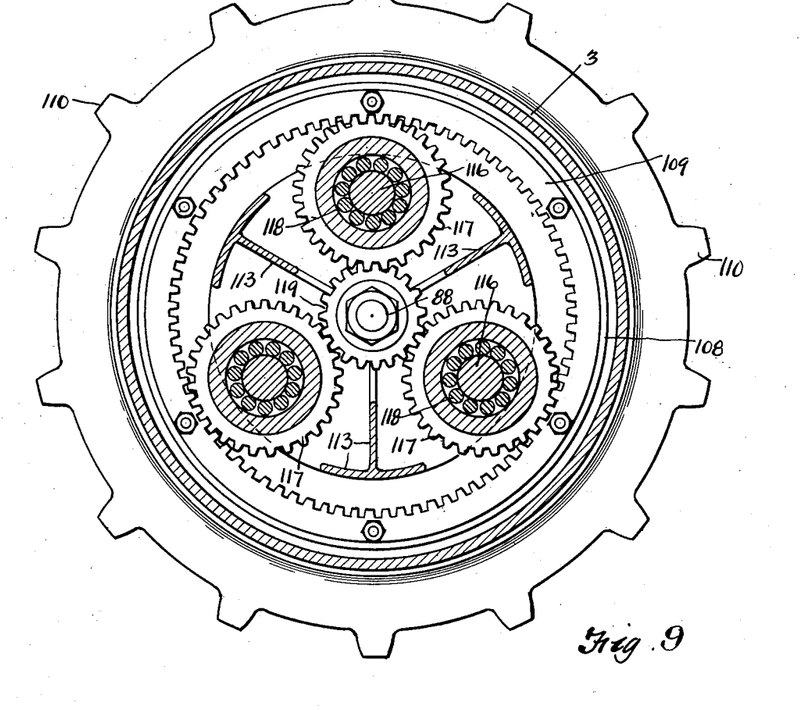
Fig. 9 is a transverse section of the driving member and gearing associated therewith, the plane of such section being indicated by the line 9—9, Fig. 7.

It will be noted that as shown in Fig. 9, the idler pinions 117 are loosely mounted on their bearings on spindles 116, a clearance of at least 1/64th of an inch being left in practice between the inner bearing surfaces of said pinions and the roller bearings 118. As a result of this construction, said idler pinions are rendered self centering and the driving torque will be transmitted equally through all three, instead of only through one, as is apt to be the case if it is attempted to so mount the spindles 116 and the pinions thereon as to accurately mesh with the driving pinion 119 and the ring gear 109.

The sprocket wheel 3 is formed with a central outwardly projecting boss 120 on which is supported, through the medium of roller bearing 121, a companion block 122 to the block 107 for the purpose of supporting the outer frame of the traction member (not shown). A cap 123 closes such bearing 121 against the entrance of dust and in order similarly to close the inner side of the sprocket wheel 3, an annular plate 124 is attached to such side of the wall adjacent its periphery, such plate being closely fitted against the tubular housing 105 by means of a ring 125 secured thereto and pressing against an interposed ring 126 of packing material.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:

1. In mechanism of the character described, the combination with two traction members; of a power-driven shaft; of independent connections from said shaft to said members for driving the latter, said connections each including an independently operable clutch provided with a spring; means adapted to actuate either or both of said clutches as desired, said means including a column mounted so as to be oscillatory either about its longitudinal axis or a transverse axis, a cross-bar on said column, and levers having no mechanical connection to said cross-bar but adapted to be engaged by said cross-bar upon movement of said column in either fashion described, said levers being operatively connected with said clutches, respectively; and means whereby the thrust of the clutch-spring is taken off the hand of the operator when the clutch is disengaged.

2. In mechanism of the character described, the combination with two traction members; of a power-driven shaft; of independent connections from said shaft to said members for driving the latter, said connections each including an independently operable clutch and brake; and means adapted successively to actuate either or both of said clutches and thereupon to actuate the corresponding brake or brakes, said means including a column mounted so as to be oscillatory either about its longitudinal axis or a transverse axis, a cross-bar on said column, and two pairs of levers, the levers of one of the pairs being operatively connected with said clutches, respectively, and the levers of the other pair with said brakes, respectively, and said cross-bar being adapted upon movement of said column in either fashion described to engage first said clutch levers and then said brake levers.

3. In mechanism of the character described, the combination with two traction members; of aligned, transversely disposed shafts for driving said members; a longitudinally disposed power-driven shaft; two parallel, similarly disposed shafts intergeared with said power-driven shaft; connections from each of said parallel shafts to one of said transverse shafts, each of said connections including a clutch provided with a spring, whereby the corresponding shafts may be disconnected; means adapted to actuate either or both of said clutches as desired, said means including a column mounted so as to be oscillatory either about its longitudinal axis or a transverse axis, a cross-bar on said column, and levers having no mechanical connection to said cross-bar but adapted to be engaged by said cross-bar upon movement of said column in either fashion described, said levers being operatively connected with said clutches, respectively, and means whereby the thrust of the clutch-spring is taken off the hand of the operator when the clutch is disengaged.

4. In mechanism of the character described, the combination with two traction members; of aligned, transversely disposed shafts for driving said members; a longitudinally disposed power-driven shaft; two parallel, similarly disposed shafts intergeared with said power-driven shaft; connections from each of said parallel shafts to one of said transverse shafts, each of said connections including a clutch, whereby the corresponding shafts may be disconnected, and a brake whereby the corresponding transverse shaft may be braked; and means adapted successively to actuate either or both of said clutches and thereupon to actuate the corresponding brake or brakes, said means including a column mounted so as to be oscillatory either about its longitudinal axis or a transverse axis, a cross-bar on said column, and two pairs of levers, the levers of one of the pairs being operatively connected with said clutches, respectively, and the levers of the other pair with said brakes, respectively, and said cross-bar being adapted upon movement of said column in either fashion described to engage first said clutch levers and then said brake levers.

5. In mechanism of the character described, the combination with two traction members; of a power-driven shaft; independent connections from said shaft to said members for driving the latter, said connections each including an independently operable clutch and brake; and means adapted successively to actuate either or both of said clutches and thereupon to actuate the corresponding brake or brakes, said means including a column mounted so as to oscillatory either about its longitudinal axis or a transverse axis, a cross-bar on said column, and two pairs of levers, the levers of one of the pairs being operatively connected with said clutches, respectively, and the levers of the other pair with said brakes, respectively, and said cross-bar being adapted upon movement of said column in either fashion described to engage first said clutch levers and then said brake levers, the former being fashioned to remain in engagement with said cross-bar until released.

6. In mechanism of the character described, the combination with a traction member; of a power driven shaft; connections from said shaft to said member for driving the latter, said connections including an independently operable clutch and brake; and means adapted successively to operate said clutch and thereupon to actuate said brake, said means including a column mounted so as to be oscillatory either about its longitudinal axis or a transverse axis, a projecting arm on said column, and a pair of levers, one whereof is operatively connected with said clutch and the other with said brake, said projecting arm being adapted upon movement of said column in either fashion described to engage first said clutch lever and then said brake lever.

7. In mechanism of the character described, the combination with a traction member; of a power driven shaft; connections from said shaft to said member for driving the latter, said connections including an independently operable clutch and brake; and means adapted successively to operate said clutch and thereupon to actuate said brake, said means including a column mounted so as to be oscillatory either about its longitudinal axis or a transverse axis, a projecting arm on said column, and a pair of levers, one whereof is operatively connected with said clutch and the other with said brake, said projecting arm being adapted upon movement of said column in either fashion described to engage first said clutch lever and then said brake lever, said clutch lever being fashioned to remain in engagement with said bar during actuation of said brake lever by the latter.

8. In mechanism of the character described, the combination with a traction member; of a power driven shaft; connections from said shaft to said member for driving the latter, said connections including an independently operable clutch and brake, said clutch being provided with a spring; and means adapted successively to operate said clutch and thereupon to actuate said brake, said means being arranged and constructed to hang said clutch in inoperative condition during actuation of said brake, whereby the clutch-spring tension on the operating handle is relieved.

9. In mechanism of the character described, the combination with a traction member; of a power driven shaft; connections from said shaft to said member for driving the latter, said connections including an independently operable clutch and brake, said clutch being provided with a spring; and means adapted successively to operate said clutch and thereupon to actuate said brake, said means including a column mounted so as to be oscillatory about its longitudinal axis, an arm projecting from said column, and a pair of levers, one whereof is operatively connected with said clutch and the other with said brake, said arm and levers having coacting faces so fashioned as to place and leave said clutch in inoperative condition during actuation of said brake, whereby the clutch-spring tension on the operating handle is relieved.

10. In mechanism of the character described, the combination with a traction member of a power driven shaft; connections from said shaft to said member for driving the latter, said connections including an independently operable clutch and brake, said clutch being provided with a spring, and means adapted successively to actuate said clutch and thereupon to actuate said brake, said means including a movable member and a pair of levers, one whereof is operatively connected with said clutch and the other with said brake, said member and levers having coacting elements so fashioned as to hang said clutch in inoperative condition during actuation of said brake, whereby the clutch-spring tension on the operating handle is relieved.

11. In mechanism of the character described, the combination with two traction members; of a power-driven shaft; independent connections optionally engageable between said shaft and said members for driving the latter, said connections each including power-transmission means and separate brake elements; and means normally unconnected but contactable on relative movement for controlling engagement of either or both of said power-transmission means and also actuating the corresponding brake or brakes.

12. In mechanism of the character described, the combination with a traction member; of a power driven shaft; connections from said shaft to said member for driving the latter, said connections including an independently operable clutch and brake, said clutch being provided with a spring; and means including a manually operated lever adapted successively to actuate said clutch and thereupon to actuate said brake, said means being arranged and constructed to hang said clutch in in-operative condition during actuation of said brake, whereby the clutch-spring tension on the operating handle is relieved.

Signed by us, this 4th day of December, 1923.

JAMES J. TRACY.
ARTHUR E. PALMER.